US007219265B2

(12) United States Patent  
Yee

(10) Patent No.: US 7,219,265 B2
(45) Date of Patent: May 15, 2007

(54) SYSTEM AND METHOD FOR DEBUGGING SYSTEM-ON-CHIPS

(75) Inventor: Oceager P. Yee, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 497 days.

(21) Appl. No.: 10/748,065

(22) Filed: Dec. 29, 2003

(65) Prior Publication Data

US 2005/0193254 A1 Sep. 1, 2005

(51) Int. Cl.
G06F 11/00 (2006.01)
(52) U.S. Cl. .......................................... 714/30; 714/726
(58) Field of Classification Search .................. 714/30, 714/27, 32, 37, 726, 727
See application file for complete search history.

(56) References Cited

U.S. PATENT DOCUMENTS

| 5,812,562 A | * | 9/1998 | Baeg ........................... 714/726 |
| 6,249,893 B1 | | 6/2001 | Rajsuman et al. |
| 6,484,280 B1 | * | 11/2002 | Moberly ....................... 714/726 |
| 6,519,711 B1 | | 2/2003 | Fischer et al. |
| 6,557,129 B1 | * | 4/2003 | Rajski et al. ................. 714/729 |
| 6,691,270 B2 | * | 2/2004 | Blasco Allue et al. ....... 714/729 |
| 6,754,862 B1 | * | 6/2004 | Hoyer et al. ................. 714/725 |
| 6,954,886 B2 | * | 10/2005 | Tu et al. ...................... 714/726 |
| 6,973,606 B2 | * | 12/2005 | Mukherjee .................... 714/724 |
| 2002/0124216 A1 | * | 9/2002 | Blasco Allue et al. ....... 714/726 |
| 2002/0138801 A1 | * | 9/2002 | Wang et al. .................. 714/729 |

* cited by examiner

Primary Examiner—Nadeem Iqbal

(57) ABSTRACT

Large, complex SoCs comprise interconnections of various functional blocks. Such functional blocks contain scan chains that are used for their individual production testing. The present invention utilizes these scan chains as a tool in the debugging of these SoCs by providing the internal contents of registers and memories contained on the SoC device. Accordingly, both hardware and software designers are provided a means to observe the effect of their designs on the internal operation of the SoC device. The invention is compatible with current integrated circuit design methodology and requires minimal area on the SoC for support circuitry.

21 Claims, 5 Drawing Sheets

SYSTEM AND METHOD FOR DEBUGGING SYSTEM-ON-CHIPS

FIELD OF THE INVENTION

The present invention relates to a system and method for debugging embedded cores based system-on-chips (SoCs), and more particularly, to a system and method for debugging complex SoCs by utilizing scan chains contained in individual processor blocks.

BACKGROUND OF THE INVENTION

Since the 1990's, integrated circuit (IC) design has evolved from a chip-set philosophy to an embedded core based SoC concept. An SoC IC includes various reusable functional blocks, such as microprocessors, interfaces, memory arrays, and DSPs (digital signal processors). Such pre-designed functional blocks are commonly called "IP cores", "cores", or "blocks", and will collectively be referred to hereafter as "functional blocks" or simply, "blocks". The resulting SoCs have become quite complex. Moreover, the techniques used in the design of these SoCs have not scaled with the complexities of chip designs. That is, SoCs are currently designed by combining functional blocks from different vendors into a single design. Prior to their incorporation on the SoC, these functional blocks typically will have been subjected to various production testing procedures, to include scan chain tests. Scan chain testing is well-known in the prior art and permits determining the internal states of various memories and registers contained on the functional block. In addition to prior testing of the component functional blocks, the interfaces between these blocks are functionally verified by various well-know techniques. Frequently, problems in the resulting SoC are encountered in spite of these two levels of testing. Moreover, if there are problems in a design after the device has been fabricated, it may be extremely difficult to determine the cause of the problems. This difficulty can be attributed to the number of functional blocks that are potential sources of the problem and the lack of visibility of the internal operation of the SoC device. Additionally, the operation of the device can differ significantly from the simple functional vectors that are typically used to verify the interfaces of the functional blocks.

Various prior art methods exist whereby designers take preventive steps for avoiding problems with their SoC designs. Preventive steps include writing many vectors to check the functionality of a device and running code coverage tools to evaluate the test results. In spite of such efforts, functional problems do occur in fabricated devices. The likelihood of functional problems occurring increases with the complexity of the SoC. For such complex systems, it is virtually impossible to write vectors to test all the different combinations of functional operation of functional blocks. Moreover, there may be functional features that the designer did not think about testing. Further, the functional problem may occur after extended periods of operation and accordingly cannot be easily detected by running simple test vectors.

When functional problems do occur with fabricated SoCs, designers attempt to determine the cause by observing the state of internal registers, internal memories, or by monitoring the outputs of the pins to the device (e.g., by various prior art means such as test probing of the device pins as well as more sophisticated methods employing computer driven debugging interfaces). Often, there is insufficient visibility to the internal state of the SoC device. In such cases, the designer must speculate as to what the cause of the functional failure is. As a result, it may take several revisions to the circuit design before the problem is corrected.

Lacking in the prior art is a more accurate means of determining the internal state of an SoC device to thereby better determine the nature of a failure and thereby more efficiently effect a remedy.

SUMMARY OF THE INVENTION

Large, complex SoCs comprise interconnections of various functional blocks. Such functional blocks contain scan chains that are used for their individual production testing. The present invention utilizes these scan chains as a tool in the debugging of these SoCs by providing the internal contents of registers and memories contained on the SoC device. Accordingly, both hardware and software designers are provided a means to observe the effect of their designs on the internal operation of the SoC device. The invention is compatible with current integrated circuit design methodology and requires minimal area on the SoC for support circuitry.

BRIEF DESCRIPTION OF THE DRAWINGS

Various embodiments of the present invention will now be described in detail in conjunction with the annexed drawings, in which.

DETAILED DESCRIPTION

Figure 1:
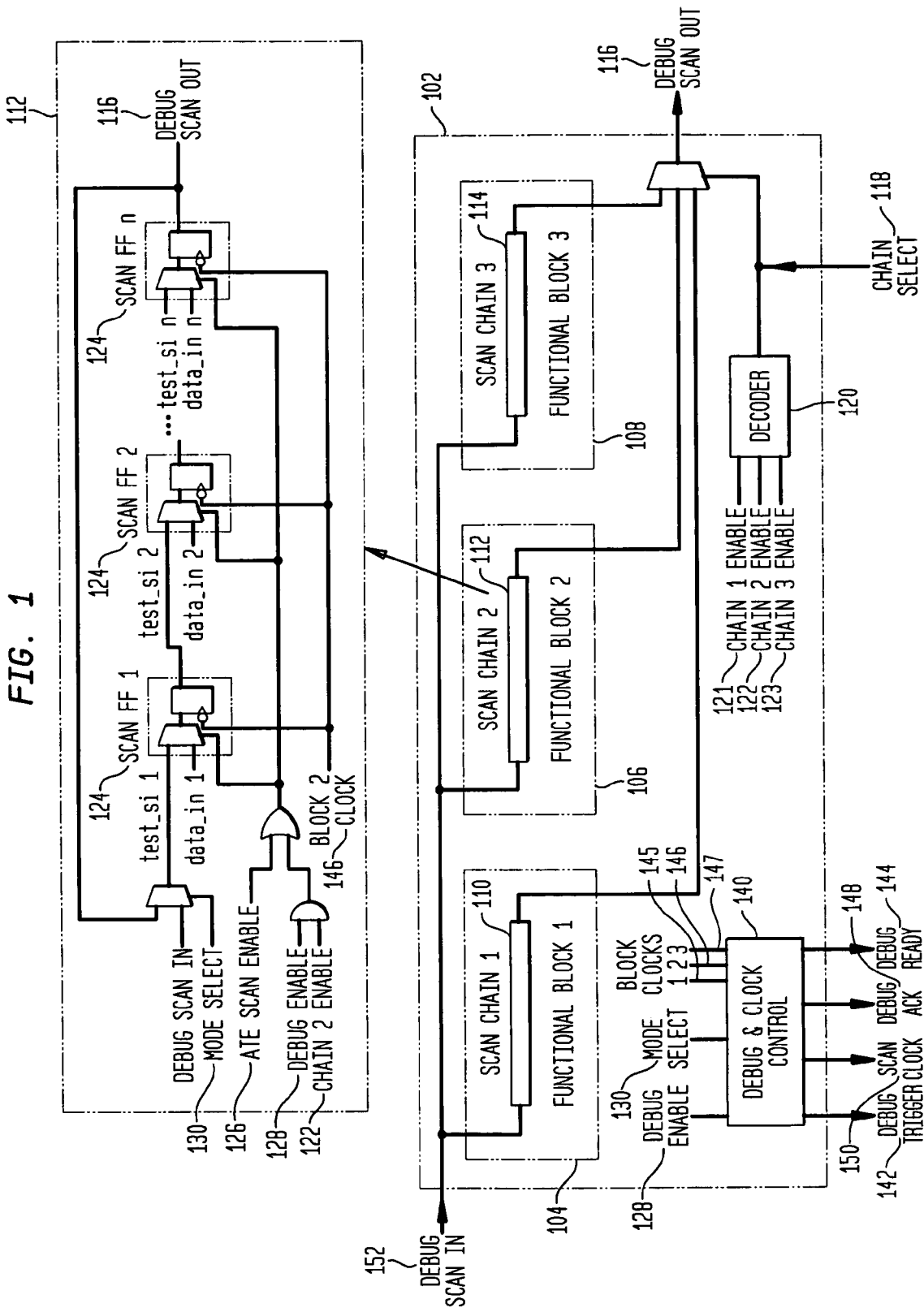
FIG. 1 is a block diagram of an embodiment of the invention wherein scan chains contained on individual functional blocks are used in the debugging of the SoC.

FIG. 1 illustrates an embodiment of the invention applicable for debugging SoCs. As shown in FIG. 1, SoC 102 includes three functional blocks (functional block 1, functional block 2 and functional block 3; represented by item numbers 104, 106 and 108, respectively). FIG. 1 is intended to be a simple example of an SoC as there frequently are far more functional blocks in an typical SoC. Each functional block may contain one or more scan chains. For simplicity, FIG. 1 shows only one scan chain (item numbers 110, 112 and 114) in each functional block. These scan chains correspond to the chains (or subsets of the chains) used in production testing of the device. By way of example, scan chain 112 is used in the production testing process of functional block 2).

In the embodiment of the invention illustrated in FIG. 1, outputs from the various scan chains are multiplexed to a single output (debug scan out 116) from which the internal state of the device can be observed. An input (chain select 118) is fed to a decoder 120 to generate the enable signal (i.e., item 122 for chain 2) to cause the scan chain to be processed. In this embodiment the total number of enable signals corresponds to the total number of scan chains in the SoC design.

Scan chain 2 (item 112) of functional block 2 (item 106), is shown expanded in the inset of FIG. 1. Flip-flops 124 operate as normal registers until configured as a scan chain for debugging—as is done normally in the production process testing of functional block 2. As illustrated in FIG. 1, the prior art loading of these registers is driven by the presence of an ATE scan enable active signal 126. In the illustrated embodiment these registers are also so configured during the invention's debugging of SoC 102 (being driven by the presence of a debug enable signal 128 AND'd with chain 2 enable signal 122). The register 124 contents are shifted out through debug scan out 116. In additional embodiments of the invention, the mode select signal 130 controls whether the register contents are re-initialized with their current contents (to allow operation of the device to continue normally after the internal state is observed) or loaded with new contents (to allow operation of the device to proceed with a new state after the internal state is observed). Since the scan chains already exist for production fault coverage testing of the functional blocks, minimal additional chip area is required to support this embodiment of the invention. Additionally, this embodiment is functionally compatible with existing design methodology for scan testing of devices.

A debug and clock control block 140 controls the operation of the SoC device in debug mode. Debug mode is triggered when a debug trigger signal 142 is activated. The debug trigger signal can be sourced from internal breakpointing logic on the SoC or from an external debug input pin to the SoC, as are well-known in the prior art. The debug enable signal 128 configures the individual register elements 124 in the functional blocks as scan chains when a scan chain is selected for debugging (e.g., chain enable active 122 for chain 2 as illustrated in FIG. 1). A debug ready signal 144 mirrors the debug enable signal 128 and indicates to the external environment when the internal state of the SoC is ready to be observed. The normal operating clocks for all the blocks (145 for block clock 1, 146 for block clock 2, 147 for block clock 3) are halted when the debug trigger signal 142 is activated. A debug ack signal 148 allows the external environment to control when the scan chain contents are actually shifted out. When debug ack signal 148 is activated, the selected block clock switches to a scan clock 150, which clocks out the contents of the selected scan chain.

Figure 2:
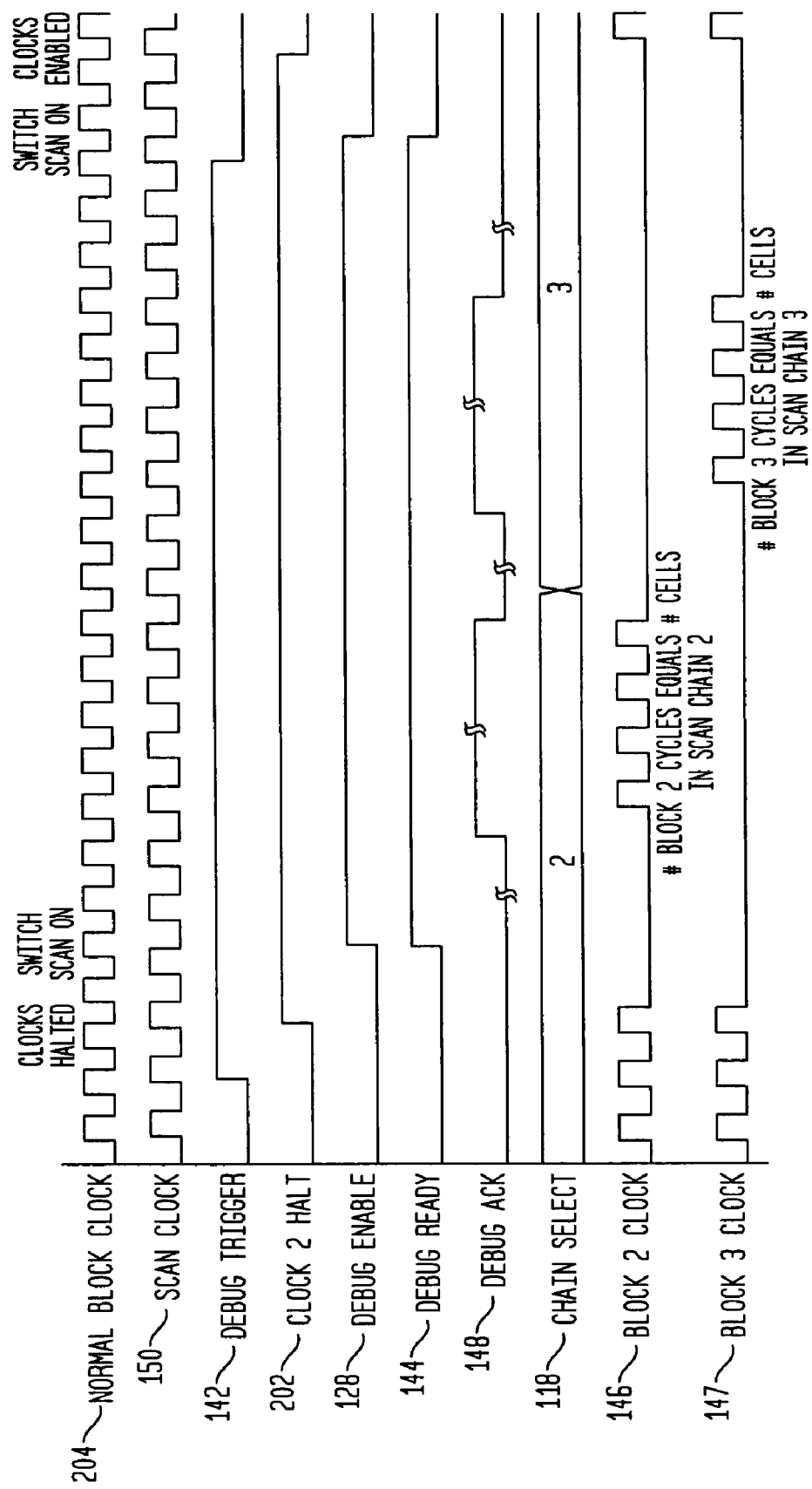
FIG. 2 is an illustration of an exemplary timing operation for debugging the SoC in accordance with an embodiment of the invention.

FIG. 2 illustrates the timing operation for the embodiment of the system depicted in FIG. 1. When the debug trigger signal 142 is activated, it is synchronized to the normal operating clock for each block. This generates the clock halt signal for each block. FIG. 2 illustrates the timing of a clock 2 halt signal 202 generated for functional block 2. As each functional block may be operating on a different clock domain, there is a different clock halt signal for each block.

When all the clocks in the SoC are halted, the combined signal is synchronized to the scan clock 150. This causes the control circuitry to trigger the debug ready 144 and debug enable signals 128. At this point, the registers in the selected scan chain (e.g., 124) are configured for scan mode operation. The user then triggers the debug ack signal 148 from the external environment to cause the selected scan chain contents to be shifted out. The debug ack signal 148 is held active long enough to scan out the entire contents of the scan chain; the number of scan cycles corresponds to the number of cells in the selected scan chain.

If the contents of more than one scan chain are to be observed, the debug trigger signal 142 is held active after scanning out the contents of the selected scan chain. The chain select signal 118 is then modified by the user to thereby select the new scan chain. Then, the newly selected scan chain is shifted out by activating the debug ack signal 148 as described previously. In this embodiment of the invention, it is envisioned that the user would have conventional diagnostic tools available to help select the scan chain(s) to be invoked. Thus for example, the type of error occurring in the SoC would, with the aide of prior art diagnostic literature for a suspect malfunction block, direct a user to those scan chains which would potentially help diagnose the problem.

It should be noted that the present invention is not limited to applications in which malfunction hardware is being diagnosed. By way of example, the present invention would be useful to a software programmer who is attempting to debug his code by examining intermediate conditions within the SoC device (e.g., in seeking to determine why his driver software is not functioning properly).

When the debug trigger signal 142 is disabled, the debug enable 128 and debug ready signals 144 are disabled by the control logic. This causes the clocks to the functional blocks to be re-synchronized to their normal operating clocks 146.

Figure 3A:
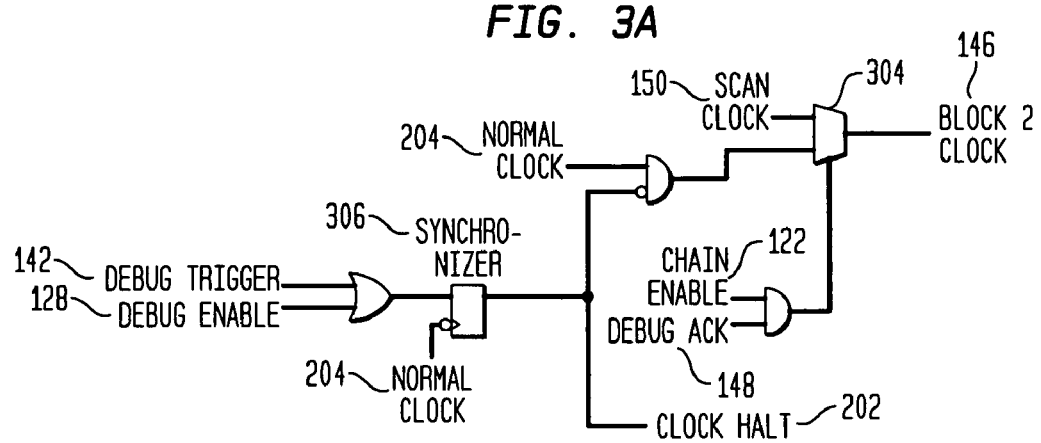
FIGS. 3A and 3B are block diagrams of the clock control circuitry for functional blocks in accordance with two embodiments of the invention.
Figure 3B:
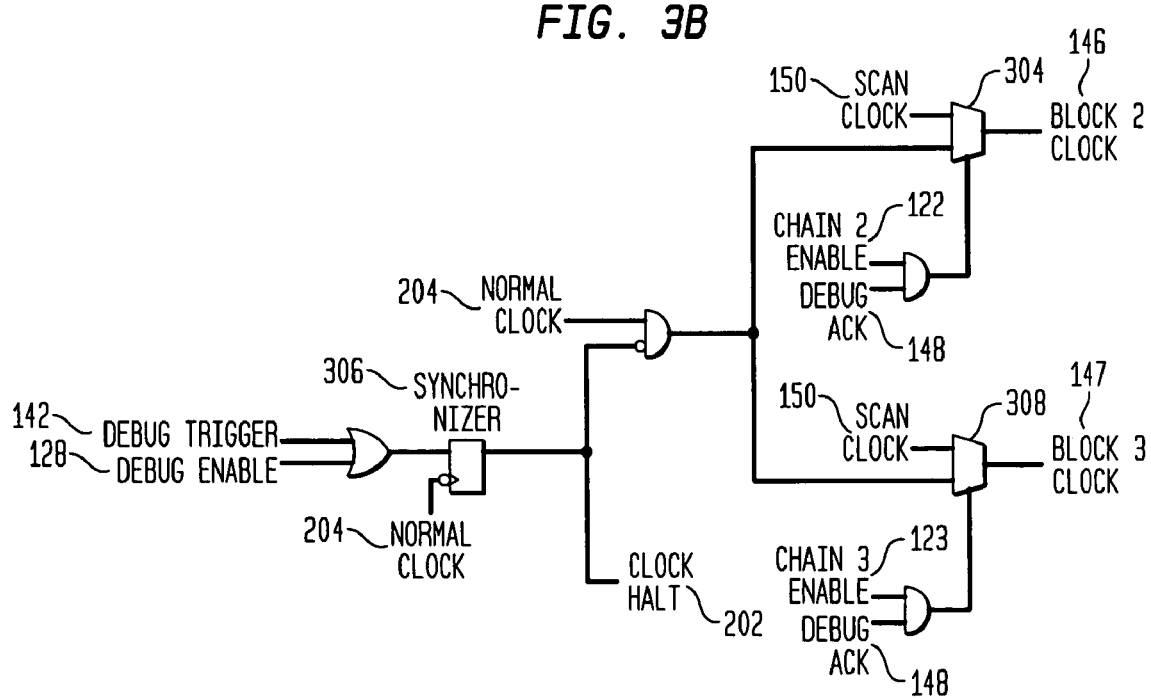

FIG. 3A shows the clock control circuitry for controlling a block clock (block 2 clock 146) in an embodiment of the invention in which the illustrated circuitry is implemented for each separate clock domain in the SoC. FIG. 3B depicts the clock control circuitry for an additional embodiment of the invention where two functional blocks share the same clock. This corresponds to the situation illustrated in FIG. 2 where block 2 clock (146) and block 3 clock (147) are both under the clock domain of normal block clock 204. In this situation, and as illustrated in FIG. 3B, the front end of the clock control circuitry can be shared by both functional blocks. Separate clock multiplexers (items 304 and 308) allow the clocks to the different scan chains to be controlled.

Figure 4:
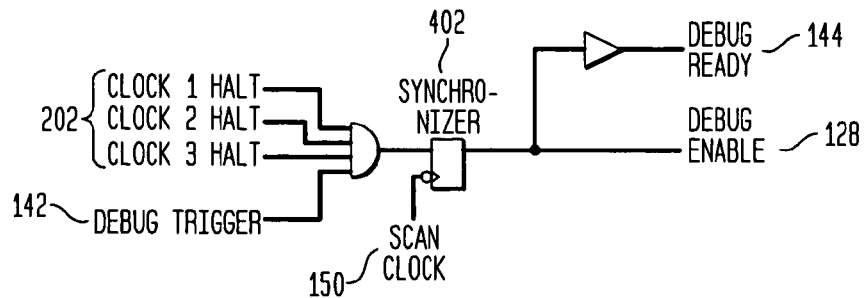
FIG. 4 is a block diagram of the debugging control circuitry in accordance with an embodiment of the invention; and, FIG. 5 is a block diagram illustrating processing of special considerations relating to the debugging process in accordance with an embodiment of the invention.

FIG. 4 shows the debug control circuitry of one embodiment of the invention. The individual clock halt signals (e.g., 202 for clock 2 halt) are gated with the debug trigger signal 142 and then synchronized to generate the debug enable 144 and debug ready signals 128.

For simplicity, omitted from FIGS. 3 and 4 is the presence of a power-up reset signal that is inputted to synchronizers (items 306 and 402, respectively), thereby resulting in a "0" output signal from said synchronizers. Use of such a reset signal is well-known in the prior art. Its use in the present invention ensures that the debug logic is not active at the time the system is powered up.

Figure 5:
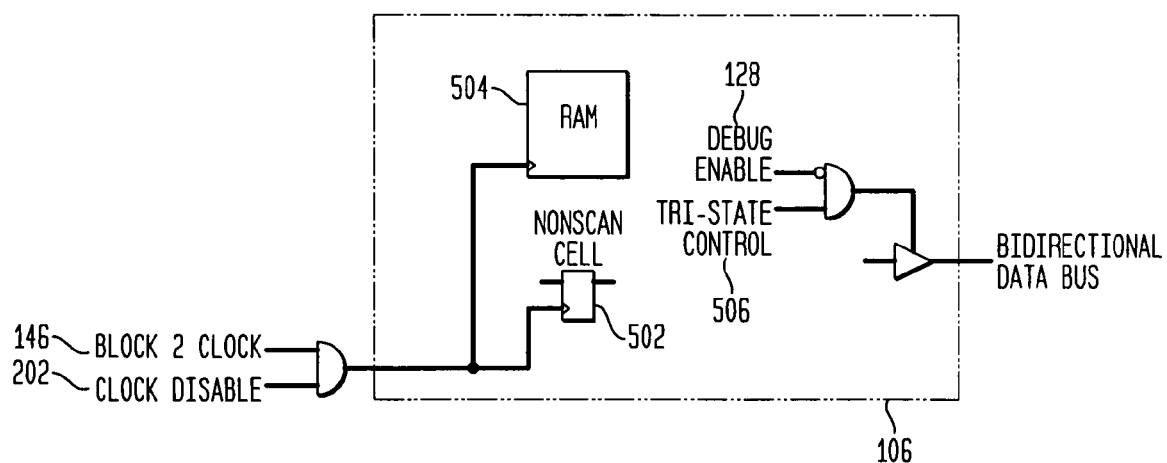

As is well known in the art, a functional block may contain cells with state information that are affected by the debugging process, when they should not be. For example, FIG. 5 shows nonscan flip-flops 502 and RAM 504 in functional block 2 that are clocked when scan chain 2 is shifted out. This could alter the contents of the nonscan flip-flops 502 and RAM 504. Since those cells are not re-initialized with their original states or loaded with new start states, the operation of the SoC would not proceed normally after the debugging process. As such, and as illustrated in FIG. 5, an additional embodiment of the invention disables the clocks to those cells to prevent them from being modified by the debugging process.

Additionally, the debugging process may cause control signals of internal bidirectional signals to become active. To prevent multiple cells from driving the bidirectional signal at the same time, a further embodiment of the invention gates the control signals 506 with the debug enable signal 128 as shown in FIG. 5.

Figure 6A:
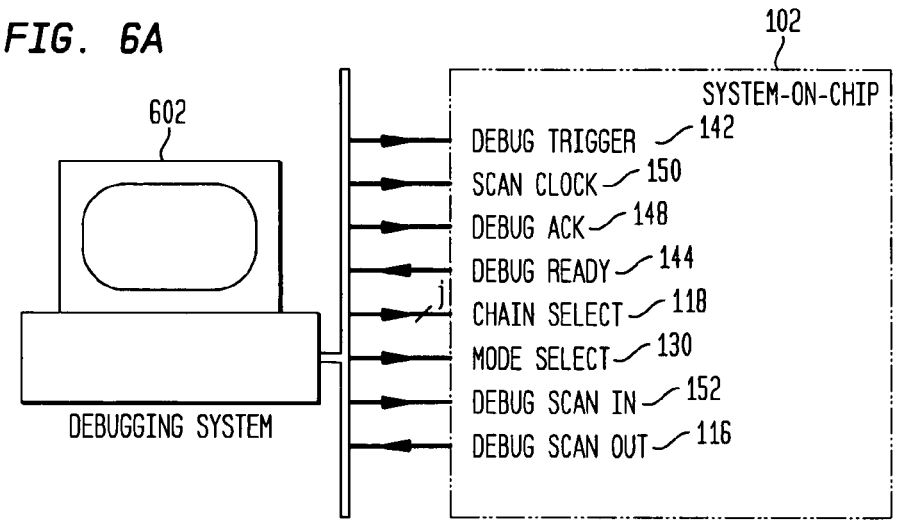
FIGS. 6A and 6B are illustrations of exemplary I/O interfaces to a debugging system in accordance with an embodiment of the invention.
Figure 6B:
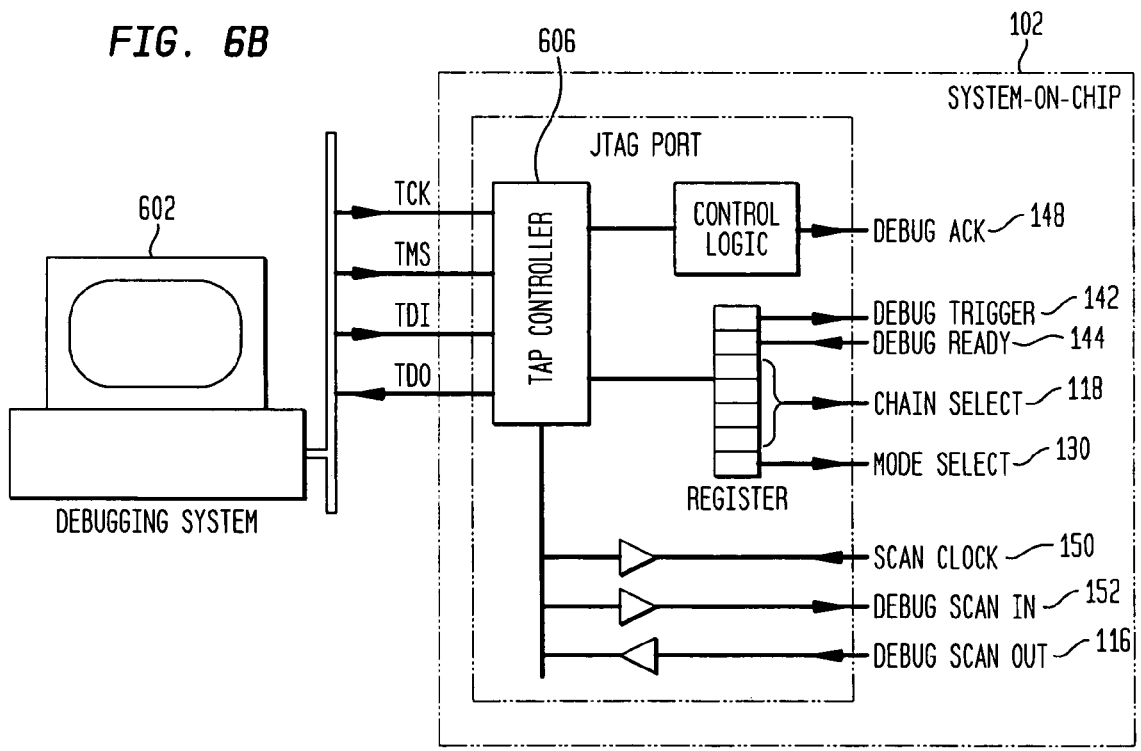

FIGS. 6A and 6B each illustrate an additional embodiment of the invention in which a debugging computer system 602 receives as inputs various signal conditions described above and also supplies various inputs to the SoC 102. These signals are bit wide with the exception of chain select, whose width is dependent on the number of scan chains in the SoC 102.

As illustrated in FIG. 6A, if there are adequate pins present on the SoC 102, the controlling signals can be connected as dedicated pins on the SoC. Otherwise, and as illustrated in FIG. 6B, the controlling signals can be connected to a serial test interface, such as the IEEE 1149.1 JTAG tap controller 606, to reduce pin count. The hook-up to a serial test interface is a well-known industry practice.

In a further embodiment of the invention, the system 602 communicates with one or more remote computer systems which perform analysis of the scan output data. This communication between such systems can occur via direct modems, internet connection, or other well-known prior art methods.

In additional embodiments of the invention the debugging system 602 provides more than just I/O support. With the design of an SoC, the order and number of registers used in the construction of the scan chains for production testing of the component functional blocks are known. This information is saved to a database that is used by the software in the debugging system 602. The debugging system is test equipment or a computer that controls the debugging process as illustrated in the timing diagram (FIG. 2) of the present application.

The debugging system 602 periodically monitors the debug ready signal 144. When the debug ready signal 144 is active, the debugging system 602 recognizes that the SoC 102 has entered debug mode, either due to a preset breakpoint or triggering of the external debug input pin. The debugging system 602 then systematically sets the chain select signal 118 to select each scan chain (110, 112, and 114) in the SoC 102 or to a subset of these scan chains selected by the system operator. The run-time information contained in the registers of the SoC 102 is then scanned out through the debug scan out signal 116, when the debugging system activates the debug ack signal 148.

In additional embodiments of the invention, when the mode select signal 130 is set to zero, this causes each scan chain (110, 112, 114) to be reinitialized with its current state, concurrently as the scan chain contents are read. This provides an effective means for observing the internal state of the SoC as it is stepped. After the internal state of the SoC has been read into the debugging system, the debugging system's software provides the user with control over the next execution state of the SoC. The user modified state for the SoC is loaded into the SoC through the debug scan in signal 152 when the mode select signal 130 is set to one, and another scan of the scan chain to be modified is performed.

In additional embodiments of the invention, software in the debugging system allows the user to efficiently process the internal state information from the SoC 102. The debugging system allows the user to trace logic states in the SoC. It also allows the user to concurrently run a software model of the SoC, enabling the user to debug by comparing the expected operation of the SoC with its actual operation (such software models are typically obtainable from the SoC vendor). In additional embodiments, the software also has the capability of pattern detection, thus allowing the user to detect when the registers or a subset of the registers have a certain state. The debugging system can be programmed to automatically check the internal state of the SoC at periodic intervals and compare the run state of the device with expected register contents.

The above-described steps can be implemented using standard well-known programming techniques. The novelty of the above-described embodiment lies not in the specific programming techniques but in the use of the steps described to achieve the described results. In a client/server environment, such software programming code may be stored with storage associated with a server. The software programming code may be embodied on any of a variety of known media for use with a data processing system, such as a diskette, or hard drive, or CD_ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that the forgoing description of the invention is by way of example only, and variations will be evident to those skilled in the art without departing from the scope of the invention, which is as set out in the appended claims.

What is claimed is:

1. A method for debugging an SoC having at least one functional block, each of said functional blocks being controlled by a block clock and at least one of said functional blocks having at least one scan chain, the method comprising the steps of:
   recognizing activation of a debug trigger signal;
   halting each block clock;
   selecting from said at least one scan chain, a selected scan chain containing at least one register element;
   providing control of the selected scan chain to a scan clock signal;
   shifting out the contents of said at least one register element in the selected scan chain; and,
   debugging the SoC using the contents.

2. The method of claim 1 further comprising the step of recognizing a debug ack signal inputted by a user.

3. The method of claim 2 further comprising the steps of:
   determining that the debug trigger signal is held active after said shifting step is completed;
   permitting the user to identify a subsequent scan chain;
   repeating said, providing, shifting and debugging steps using said subsequent scan chain as the selected scan chain.

4. The method of claim 1 further comprising the steps of:
   recognizing the deactivation of the debug trigger signal; and,
   returning each block clock to its operative state.

5. The method of claim 4 further comprising a step of configuring each of the at least one register elements in said selected scan chain with test values, wherein said configuring step occurs previous in time to said recognizing and said returning steps.

6. The method of claim 1 wherein the SoC comprises cells containing nonscan flip-flops, the method further comprising the step of disabling all clocks to said cells while said debug trigger signal is active.

7. The method of claim 1 wherein the SoC contains at least one device controlling a bidirectional data bus, the method further comprising the step of disabling said devices while said debug trigger signal is active.

8. An apparatus for debugging an SoC having at least one functional block, each of said functional blocks being controlled by a block clock and at least one of said functional blocks having at least one scan chain, the apparatus comprising:
means for recognizing the activation of a debug trigger signal;
means for halting each block clock;
means for selecting from said at least one scan chain, a selected scan chain, said scan chain containing at least one register element;
means for providing control of the scan chain to a scan clock signal;
means for shifting out the contents of said at least one register element in the selected scan chain; and,
means for debugging the SoC utilizing said contents.

9. The apparatus of claim 8 further comprising a means for recognizing a debug ack signal inputted by a user.

10. The apparatus of claim 9 further comprising:
means for determining that the debug trigger signal is held active after said scan chain contents have been shifted out;
means for permitting the user to identify a subsequent scan chain;
means for repeating said providing, shifting and debugging operations using said subsequent scan chain as the selected scan chain.

11. The apparatus of claim 8 further comprising:
means for recognizing the deactivation of the debug trigger signal; and,
means for returning each block clock to its operative state.

12. The apparatus of claim 11 further comprising a means for configuring each of the at least one register elements in said selected scan chain with test values, wherein said configuring occurs previous in time to invoking said means for recognizing and said means for returning.

13. The apparatus of claim 8 wherein the SoC comprises cells containing nonscan flip-flops, the apparatus further comprising a means for disabling all clocks to said cells while said debug trigger signal is active.

14. The apparatus of claim 8 wherein the SoC contains at least one device controlling a bidirectional data bus, the apparatus further comprising a means for disabling said devices while said debug trigger signal is active.

15. The apparatus of claim 8 wherein said means for debugging comprises a computer.

16. The apparatus of claim 15 wherein said computer is at a location remote from the SoC.

17. The apparatus of claim 15 wherein said computer comprises a means for automatically debugging said SoC.

18. The apparatus of claim 15 wherein said means for debugging further comprises:
a means for running a software model of the SoC to yield expected system content values; and, a means for comparing said expected system content values with the scan contents.

19. A data storage media comprising indicia of instructions for a processor to perform a method of debugging a SoC, said SoC having at least one functional block, each of said functional blocks being controlled by a block clock and at least one of said functional blocks having at least one scan chain, the method comprising the steps of:
recognizing activation of a debug trigger signal;
halting each block clock;
selecting from said at least one scan chain, a selected scan chain containing at least one register element;
providing control of the selected scan chain to a scan clock signal;
shifting out the contents of said at least one register element in the selected scan chain; and,
debugging the SoC using the contents.

20. The method of claim 1 wherein the debugging step comprises:
retrieving stores information concerning the SoC from a database.

21. The method of claim 20 wherein the debugging step further comprises:
comparing the contents to the stored information.

* * * * *